G. H. AND H. F. ROGGE.
TIRE CARRIER.
APPLICATION FILED DEC. 30, 1919.
1,361,745.
Patented Dec. 7, 1920.
2 SHEETS—SHEET 1.
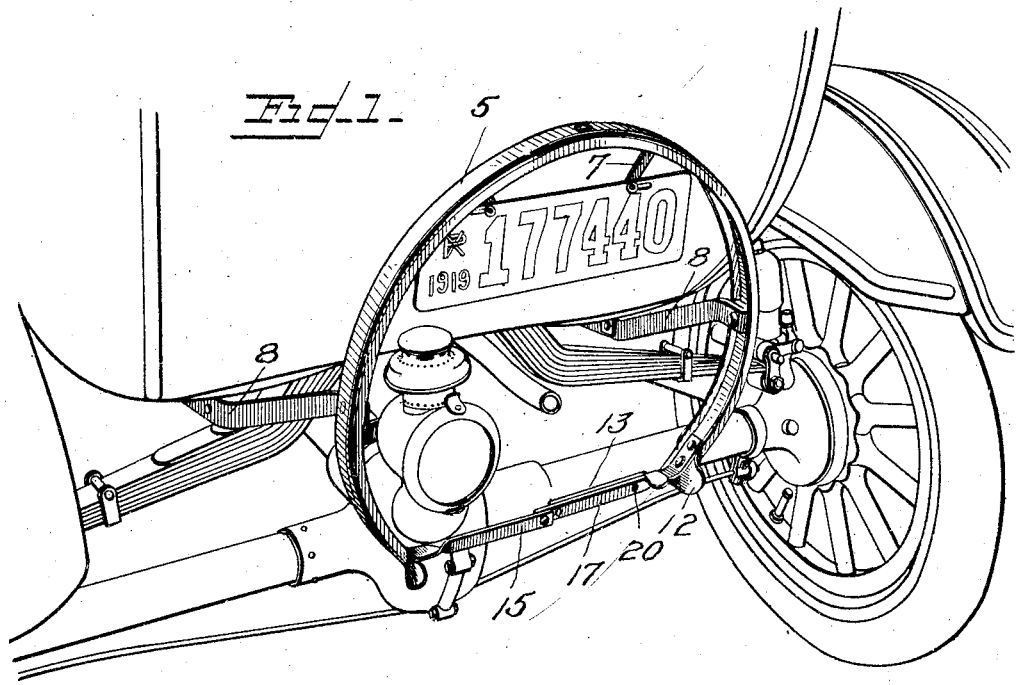
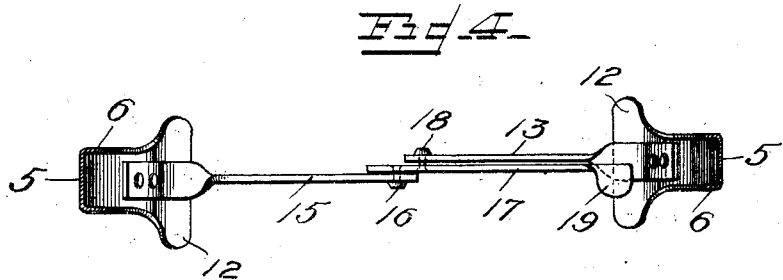
WITNESSES
Charles N. Ourand
Philip E. Siggers
INVENTORS
G. H. Rogge, H. F. Rogge
BY
ATTORNEY

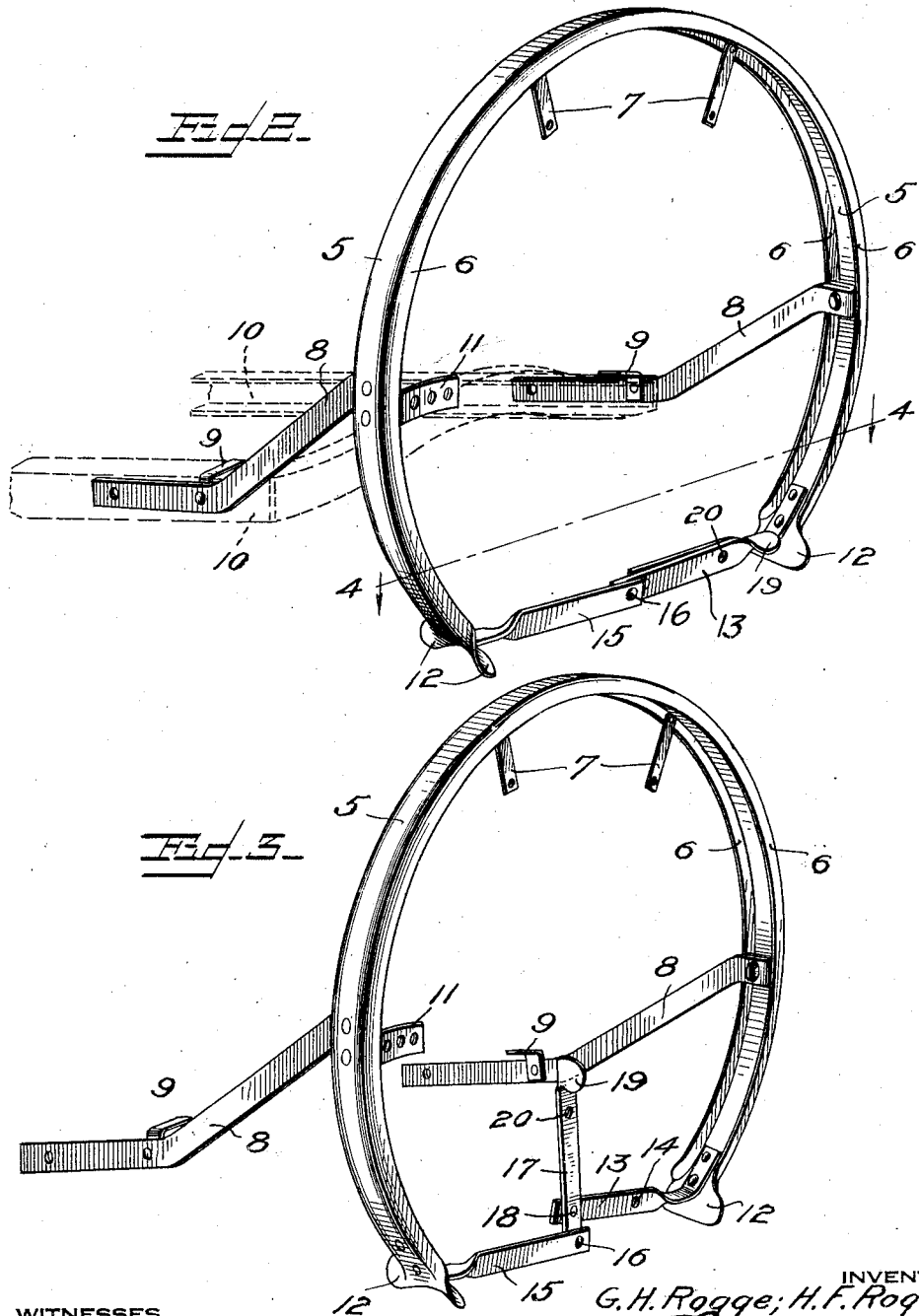

UNITED STATES PATENT OFFICE.

GEORGE HENRY ROGGE AND HARRY FRED ROGGE, OF DAYTON, OHIO.

TIRE-CARRIER.

1,361,745.     Specification of Letters Patent.     Patented Dec. 7, 1920.

Application filed December 30, 1919. Serial No. 348,338.

*To all whom it may concern:*

Be it known that we, GEORGE H. ROGGE and HARRY F. ROGGE, citizens of the United States, residing at Dayton, in the county of Montgomery and State of Ohio, have invented a new and useful Tire-Carrier, of which the following is a specification.

This invention relates to tire carriers of the type especially adapted to be mounted upon the rear end of an automobile to carry a spare tire.

An object of the invention is to provide a tire carrier which is expansible to firmly hold a spare tire on the back of an automobile, and which, when expanded, is adapted to coöperate with a lock, whereby the tire cannot be removed.

A further object is to provide a tire carrier which will hold the tire in place without recourse to bolts and lugs which require a wrench and are often difficult to remove.

Another object is to furnish a tire carrier of the expansible type whose expansion is equal throughout its perimeter, thus fitting within the rim of the spare tire without springing or bending the same.

Other objects are to provide a tire carrier whose construction is simple, strong and durable, and which is easy to operate.

The invention will be best understood from a consideration of the following detailed description taken in connection with the accompanying drawings forming part of this specification, with the understanding, however, that the invention is not confined to any strict conformity with the showing in the drawings, but may be changed and modified, so long as such changes and modifications mark no material departure from the salient features of the invention as expressed in the appended claims.

In the drawings,

Figure 1 is a perspective view of an embodiment of the invention as it appears when mounted upon the rear end of an automobile.

Fig. 2 is a perspective view of a tire carrier in locking position, the frame parts to which it is attached being shown in dotted lines.

Fig. 3 is a similar view of the tire carrier, showing it in unlocked position.

Fig. 4 is a cross section on the line 4—4 of Fig. 2, looking downwardly.

A segmental ring 5 whose perimeter may comprise an arc of approximately 300° forms the carrying member for the spare tire. This ring 5 is provided with inturned flanges 6 which give the ring member a channel cross section and add considerably to the strength of the ring. Near the top of the ring, straps 7 are secured in any desirable way, to which straps a license tag may be attached, as shown in Fig. 1, so that it hangs within the ring at the top.

The ring is supported by bars 8 which are bent to incline downwardly and outwardly from the ring and are secured to frame members 10 of the automobile by means of bolts or the like and supporting brackets 9. The bars 8 are fastened to the ring at points diametrically opposite each other and lying in a substantially horizontal plane near the transverse center of the ring. Each bar 8 lies in a vertical plane with an edge uppermost. The ring is also provided with a rear lamp bracket 11.

At the free ends of the ring, which ends may be spaced apart a distance of sixty arcuate degrees, the flanges 6 which are inturned throughout the remainder of the perimeter of the ring, are spread out laterally to provide flared ends 12. This flared construction is relied upon to engage with the inner face of the rim of the tire adapted to be held upon the carrier.

To one of the free ends of the ring, above the flared end 12, a bar 13 is secured, provided with a perforation 14 intermediate its ends. The other free end of the segmental ring has a bar 15 similar to the bar 13 made fast thereto. Near the outer end of the bar 15 a lever 17 is pivoted which lever is also pivotally connected with the outer end of the bar 13, as by a rivet or the like 18. The lever 17 is further provided with a perforation 20. The outer end of the lever is bent at right angles to provide a thumb piece 19.

The rings is made of resilient metal. When the tire is to be placed upon the carrier, the carier will be in the position illustrated in Fig. 3, then the lever 17 will be swung downwardly into alinement with the bar 15, which movement will spring the free ends of the segmental ring apart and will cause the ring to expand throughout its perimeter. The supporting bars 8 have sufficient length and "give" to them to permit this expansion of the ring throughout its length. This is due to the fact that the bars are formed of flat metal set edgewise, with the flat faces of the bars arranged substantialy vertical, so that when the ring is expanded or contracted, the bars will yield laterally, but will resist downward or vertical movement.

When the ring is in tire-holding position, the bars 13 and 15 and the lever 17 will lie in a substantially horizontal position, as Figs. 1 and 2 depict. The perforations 20 and 14 match with each other in this position of the parts and are adapted to receive a padlock (not shown) or the like whereby the ring may be secured in its tire-holding position in such a way that thieves cannot remove the tire. The flared ends 12 are formed so as to fit about the underside of the rim of the tire and make it impossible for any amount of jolting or the like to dislodge the tire from its seat.

What is claimed is:

1. In a tire carrier, a segmental ring having inturned flanges along each side forming a channel cross section, the outer face of the ring being smooth, the free ends of said ring being enlarged laterally at each side and backwardly flared, supporting means fixed to the ring at such points as not to interfere with expansion or contraction thereof, and means for expanding the ring by spreading the free flared ends thereof.

2. In a tire carrier, a ring having a channel cross section, the free ends of the ring being spread out and flared lateraly, supporting means connected to the ring at a point above the free ends thereof and at diametrically opposite points, and means for expanding the ring, said means being connected to the ring at points adjacent to but short of the flared ends.

In testimony that we claim the foregoing as our own, we have hereto affixed our signatures in the presence of two witnesses.

GEORGE HENRY ROGGE.
HARRY FRED ROGGE.

Witnesses:
CHARLIE F. ISRAEL,
CHARLES C. SNYDER.